United States Patent
Reifenhäuser

[11] Patent Number: 5,253,992
[45] Date of Patent: Oct. 19, 1993

[54] EXTRUDER DIE FOR THE EXTRUSION OF THERMOPLASTIFIED SYNTHETIC RESIN

[75] Inventor: Hans Reifenhäuser, Troisdorf, Fed. Rep. of Germany

[73] Assignee: Reifenhauser GmbH & Co. Maschinenfabrik, Troisdorf, Fed. Rep. of Germany

[21] Appl. No.: 841,345

[22] Filed: Feb. 25, 1992

[51] Int. Cl.⁵ .................... B29C 47/22; B29C 47/92
[52] U.S. Cl. .................... 425/72.1; 425/141; 425/381; 425/466
[58] Field of Search ........ 425/72.1, 141, 140, 425/381, 466, 133.5; 264/40.1, 40.5

[56] References Cited

U.S. PATENT DOCUMENTS

| | | | |
|---|---|---|---|
| 2,938,231 | 5/1960 | Lowey, Jr. | 425/466 |
| 3,535,739 | 10/1970 | Mehnert | 425/381 X |
| 3,975,132 | 8/1976 | Keim | 425/394 X |
| 4,125,350 | 11/1978 | Brown | 425/141 X |
| 4,592,710 | 6/1986 | Reifenhauser et al. | 425/141 |
| 4,594,063 | 6/1986 | Reifenhauser et al. | 425/141 |
| 4,741,686 | 5/1988 | Cazzani et al. | 425/466 X |
| 4,863,361 | 9/1989 | Boos | 425/466 X |
| 4,911,868 | 3/1990 | Reifenhauser et al. | 425/141 X |
| 4,944,666 | 7/1990 | Hilke et al. | 425/141 X |
| 5,110,518 | 5/1992 | Halter | 425/141 X |

FOREIGN PATENT DOCUMENTS

| | | |
|---|---|---|
| 1218702 | 6/1966 | Fed. Rep. of Germany . |
| 3427912C1 | 3/1986 | Fed. Rep. of Germany . |
| 4106487 | 2/1992 | Fed. Rep. of Germany . |
| 54-146859 | 11/1979 | Japan . |

*Primary Examiner*—Richard L. Chiesa
*Attorney, Agent, or Firm*—Herbert Dubno

[57] ABSTRACT

An extrusion die for extruding a thermoplastified synthetic resin, e.g. for a foil-blowing head or a wide-slit nozzle can have its adjustable lip positioned to vary the thickness of the extruded strand by a driver acting on a rod engaging that lip and driven by a step-down transmission from a servomotor which may be a stepping motor.

2 Claims, 4 Drawing Sheets

EXTRUDER DIE FOR THE EXTRUSION OF THERMOPLASTIFIED SYNTHETIC RESIN

CROSS REFERENCE TO RELATED APPLICATION

This application is related to my commonly assigned copending application Ser. No. 07/841,337, filed concurrently herewith.

FIELD OF THE INVENTION

My present invention relates to an extrusion die for the extrusion of thermoplastified synthetic resins and, more particularly, to an improved die having means for adjusting the extrusion gap or orifice width to control the thickness of the extruded strand.

Specifically, the invention relates to an extruder die of the type having a gap-controlling die lip juxtaposed with a counterlip to define the extrusion orifice and in which the gap-controlling lip is connected to or provided with at least one axially-adjustable positioning rod which is associated with a control or regulating system for the gap width and which thereby controls the thickness of the extruded synthetic resin strand at least locally.

BACKGROUND OF THE INVENTION

It is known to provide extrusion dies in which the extrusion orifice from which a strand of thermoplastified synthetic resin emerges with a pair of lips at least one of which can be adjustable, i.e. displaceable toward and away from the other lip to define the gap width between the lips and hence the orifice width and the thickness of the resulting extruded strand.

It is important in the operation of an extrusion press, e.g. a worm system for thermoplastifying the synthetic resin and which is provided at its output side with the extrusion die, to be able to adjust the gap width with high precision and to maintain an adjusted gap width with narrow tolerances and so that it is controllable with very brief setting times and practically no dead time in the setting response. The precision requirements for such systems have grown with the development of plastic technology.

In the extruder die with respect to which the present invention constitutes an improvement (see U.S. Pat. No. 2,938,231), the positioning rod is a metal bolt or pin whose head is formed with a screw thread and which is threaded into a corresponding bore in the die body. The shaft of this bolt is heated by ohmic heat via a respective heating element and the thermal expansion of the bolt or rod generates an adjustment displacement or throw of the device in response to the control and/or regulating unit which provides fine control or regulation of the displacement of the lip and hence of the thickness of the extruded strand which is thus produced.

The coarse setting is effected by screwing the bolt further into the respective bore utilizing the thread formed on the head and cannot be effected in a tolerance-free manner. It is also possible to effect coarse adjustment by adjusting the counterlip. The coarse adjustment and the fine adjustment can be coupled together in this manner so that the tolerances of the coarse adjustment can affect the precision of the fine adjustment.

The heating element is associated with the control and regulating system and allows the bolt shaft to be set at an adjustable temperature within a predetermined temperature range and to be maintained at this temperature until control or regulation requires another increment of displacement, whereupon the temperature of the bolt shaft is changed.

The drawbacks of such a system should be apparent. On the one hand, a temperature increase in the bolt shaft can be developed only slowly for physical reasons so that the setting time for establishing a particular precision of the lip is long and the system has substantial adjustment inertia or dead time, i.e. a slow response. On the other hand, because of practically unavoidable temperature inhomogeneities of the bolt shaft, a precision of the control or regulation, once the die has been warmed up, cannot be ensured because of thermal coupling in the system.

In the system of German patent document 34 27 912, and U.S. Pat. No. 4,592,710, which operates, by comparison, with much higher precision and much smaller setting time and dead times, i.e. with faster response, the positioning elements are field translators.

Field translators are piezoelectric effectors or magneto-strictive effectors, i.e. electrically controllable positioning elements operating in accordance with the piezoelectric effect or the magnetostrictive effect. While such systems have been found to be successful for many purposes, such field translators are not capable of generating extremely high positioning forces and are also not capable of maintaining such forces for long periods.

OBJECTS OF THE INVENTION

It is, therefore, the principal object of the present invention to provide an improved extruder die which satisfies the requirements of high precision of adjustment of the extruded strand thickness and rapid response in terms of small setting times and low dead times, and which nevertheless is capable of providing very high setting forces for adjustment of the gap or orifice width.

It is another object of my invention to provide an improved extrusion die capable of orifice or gap adjustment, but which is free from drawbacks of the prior art.

SUMMARY OF THE INVENTION

These objects and others which will become apparent hereinafter are attained, in accordance with the invention, in an extrusion die in which the adjustment rod is actuated by a servomotor having an angular displacement output which is applied via a step-down transmission to a driver acting upon the rod.

The assembly of the servomotor, step-down transmission and driver can develop, especially where the driver is an eccentric, very high forces allowing very precise adjustment of the lip of an extrusion die with very short setting times and practically no dead time. Setting forces of 10,000N and more can be developed and maintained by such a device.

More particularly, an extrusion die for extruding thermoplastified synthetic resin can comprise:
- a die body formed with a passage for a thermoplastified synthetic resin;
- an outlet orifice on the body communicating with the passage and defined between a gap-controlling adjustable lip and a counterlip, whereby adjustment of a gap width between the lips varies a thickness of an extruded strand of the thermoplastified synthetic resin emerging from the orifice;

at least one axially shiftable positioning rod on the body acting upon the gap-controlling lip for displacing same to adjust the gap width; and a control and regulating device for actuating the positioning rod, the control and regulating device including:

a servomotor having an angularly displaceable output element, a step-down transmission driven by the output element, and a driver displaceable by the transmission and acting upon the rod.

According to a feature of the invention, the assembly of the servomotor, which can be an electrically-operated stepping motor, the step-down transmission and driver can form a unit which is received in a receptacle provided in the body of the extrusion die and which can be braced, in turn, by at least one adjusting screw so that it can be adjusted.

As noted, the driver can be an eccentric although it is also possible to form the driver as a linear cam driver.

In either case, a restoring force is applied to the position rod by a restoring spring which can be the resiliently deflectable lip itself.

The counterlip can be provided with a coarse setting device, for example, a rod displaceable by a screw-thread arrangement and without the servomechanism of the invention for the simplest coarse setting of the thickness of the extruded strand. The precision screw is preferred for this purpose.

The invention is applicable to wide-slit nozzles as well as to foil-blowing heads, e.g. as described in the aforementioned copending application.

BRIEF DESCRIPTION OF THE DRAWING

The above and other objects, features and advantages of the present invention will become more readily apparent from the following description, reference being made to the accompanying drawing in which.

DETAILED DESCRIPTION OF THE PREFERRED EMBODIMENTS

Figure 1:
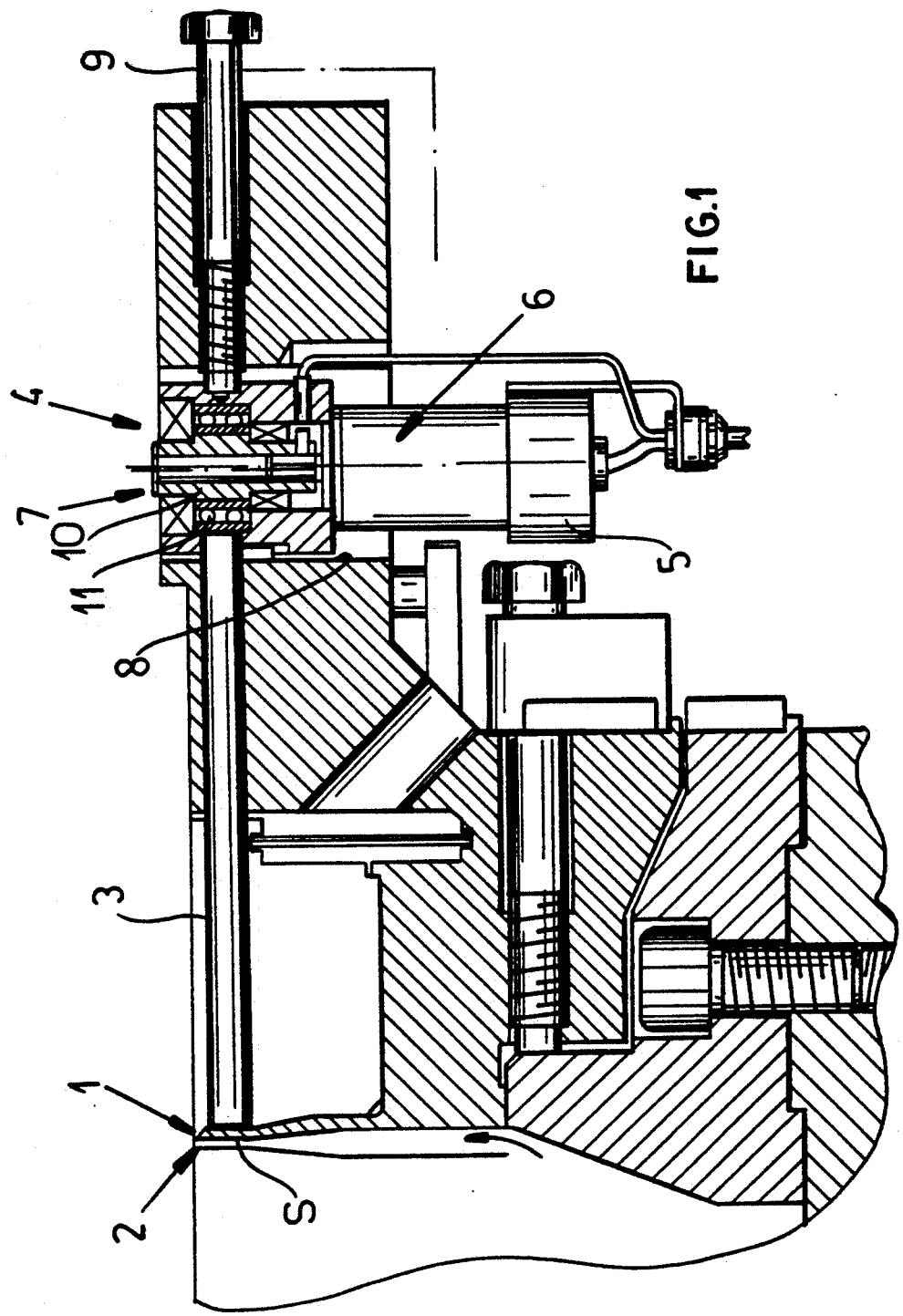
FIG. 1 is a vertical section through a portion of an extrusion die incorporated in a foil-blowing head according to the invention.
Figure 2:
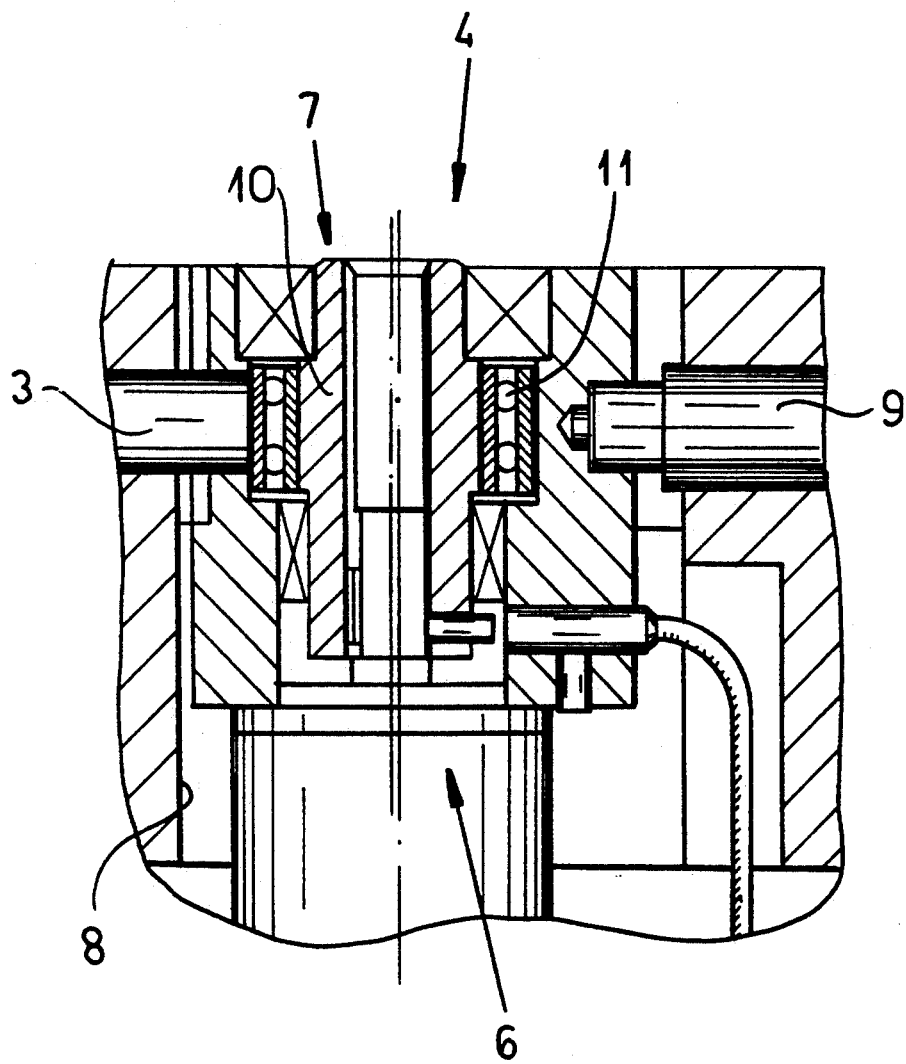
FIG. 2 is a detail view of the eccentric driver thereof.

The extrusion die shown in FIGS. 1 and 2 is used for the extrusion of a tube of thermoplastified synthetic resin for blowing in a blowing head (see the aforementioned copending application) and for this purpose the extrusion orifice has an outlet gap S whose width can be controlled to regulate the thickness of the extruded strand. The gap S is defined between a gap-controlling adjustable lip 1 which is resiliently deflectable, and a counterlip 2. The latter can be coarsely adjusted in position by a precision screw and, in the case of a blowing head, by a number of such adjusting screws extending radially and spaced around the inner periphery of this lip.

The gap-controlling adjustable lip 1 is provided with a multiplicity of radial axially-displaceable positioning rods 3 forming part of the control and regulating device 4 for the gap width and thus for the thickness of the extruded synthetic resin.

It will be appreciated that, depending upon the length of the gap and in the case of the extruded tube, the circumference, a greater or lesser number of such rods may be provided to press against locally distinct regions of the displaceable lip. In a limiting case, only one such rod may be necessary. In the case of a blowing head as described in the aforementioned application, however, the rods are equidistantly-spaced around the periphery of the deflectable lip.

As will be apparent from FIGS. 1 and 2, the or each rod 3 is actuated by a servomotor 5 which may be a pulse-driven stepping motor receiving an input from a computer or control circuit monitoring the thickness of the extruded strand as described in the aforementioned copending application. This servomotor is physically connected with and drives a step-down transmission 6 which can be provided with gearing transforming the angular displacement of the servomotor 5 into a smaller increment of angular displacement of its output shaft which carries the driver 7. The driver 7 in the embodiment illustrated in FIGS. 1 and 2 is an eccentric.

The assembly of the motor 5, the step-down transmission 6 and the driver 7 forms a unit received in a receptacle 8 of the die body.

For each of these units, at least one adjusting screw 9 is threaded into the die body to brace the eccentric and position the unit.

As will also be apparent from FIG. 2, the eccentric comprises an eccentric disk 10 surrounded by a roller bearing 11 which is disposed between the screw 9 and the rod 3 so that the actuation of the rod 3 is not effected by any friction between the driver 7 and the latter.

The resiliently deflectable lip 1 acts as a restoring spring maintaining the rod 3 pressed against the driver.

The apparatus shown in FIGS. 1 and 2 forms part of a blowing head in which a multiplicity of the rods 3 and the units 5-7 are angularly equispaced around the generally cylindrical lip 1.

Figure 3:
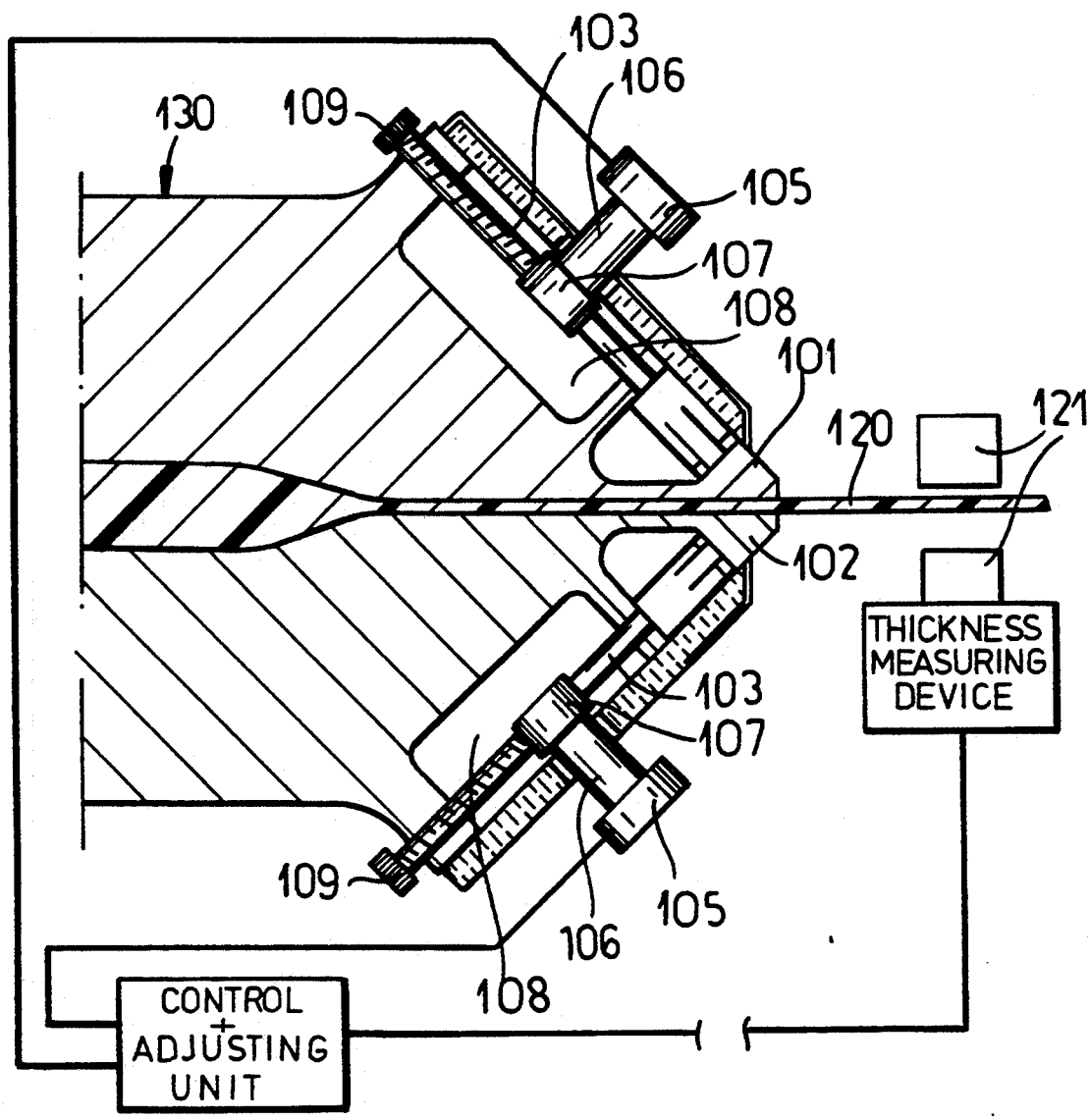
FIG. 3 is a section through a wide-slit nozzle provided with the improved lip-control system.
Figure 4:
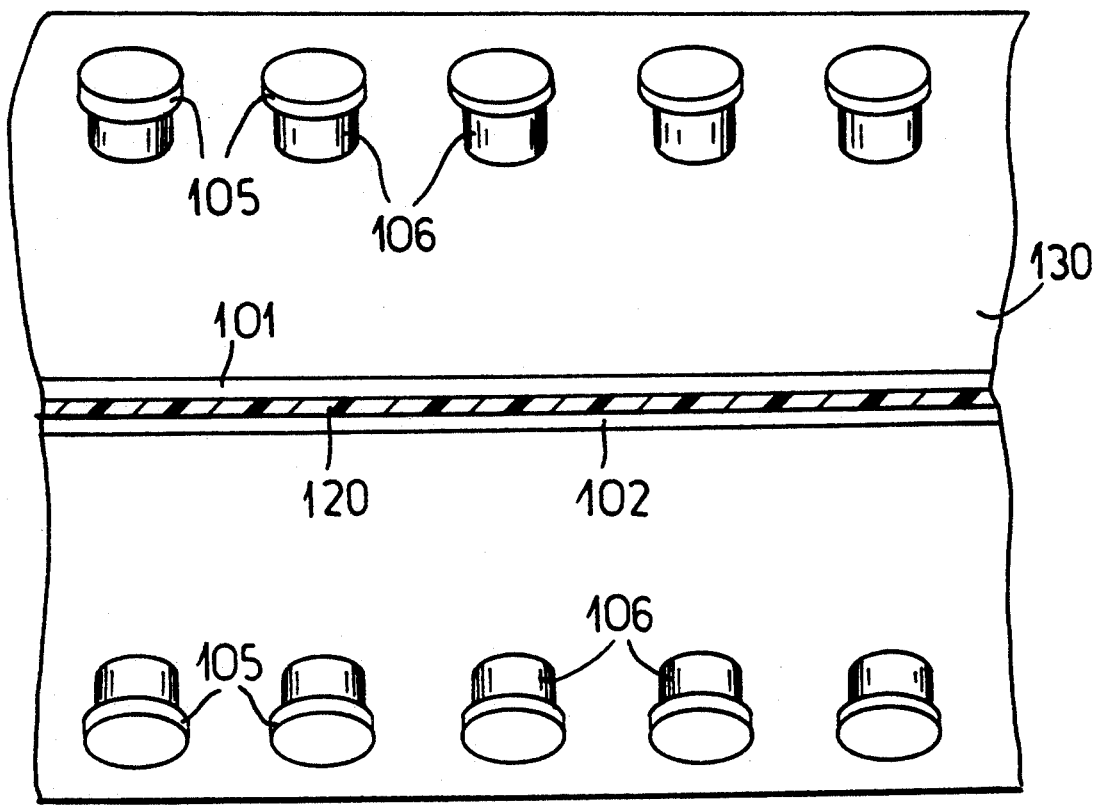
FIG. 4 is an end view of this nozzle.

In FIGS. 3 and 4, however, I show the invention as applicable to a wide-slit nozzle of an extrusion die as otherwise shown in U.S. Pat. No. 4,594,063 and in which the field translators are replaced by servomotors, transmissions and eccentrics as previously described. The lips 101 and 102 of this extrusion die define a gap through which a band 120 of the thermoplastified synthetic resin from an extruder emerges, the thickness of this band being monitored as represented at 121 and the servomotors 105 positioning the lips being adjusted accordingly. Spaced along each of the lips 101, 102 are rods 103, each of which is displaceable by a respective eccentric 107 as described in connection with FIG. 2, from a step-down transmission 106 driven by the respective servomotor 105. The units 105, 106, 107 are received in receptacles 108 formed in the die body 130. The adjusting screws equivalent to the screw 9 are shown at 109 in FIGS. 3 and 4.

Figure 5:
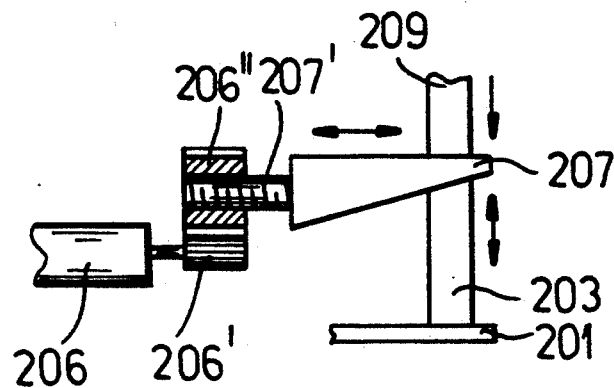
FIG. 5 is a diagram showing a linear cam driver for the servomotor and its step-down transmission.

In FIG. 5, I have shown, in addition, a linear cam driver of 207 which can be displaced between the rod 203 controlling the lip 201 and the adjusting screw 209 by the step-down transmission 206 driven by a servomotor, not shown.

For this purpose, the output shaft of the servomotor 206 can carry a pinion 206' which drives an axially-fixed nut 206" engaging a thread 207' to a rod connected to the linear driver 207. It will be appreciated that the operation of the device of FIG. 5 is similar to that of FIG. 2 in that high forces can be developed at the rod 203 with practically no dead time and no delay.

I claim:

1. An annular extrusion die for extruding a tubular strand of thermoplastified synthetic resin for blowing into a foil and forming part of a foil blowing head, said die comprising:
   - a die body formed with an annular passage for a thermoplastified synthetic resin;
   - an annular outlet orifice on said body communicating with said passage and defined between a gap-controlling resilient adjustable annular lip and an annular counterlip, whereby adjustment of a gap width between said lips varies a thickness of said strand of said thermoplastified synthetic resin emerging from said orifice;
   - at least one axially shiftable positioning rod on said body acting upon said gap-controlling lip for displacing same to adjust said gap width, said gap-controlling lip acting resiliently against said rod as a restoring spring; and
   - a control and regulating device for actuating said positioning rod, said control and regulating device including a unitary assembly of:
     - a servomotor in the form of a stepping motor having an angularly displaceable output element,
     - a step-down transmission driven by said output element, and
     - a driver in the form of san eccentric disk rotatable by said transmission having a roller bearing on a periphery of the disk and acting upon said rod whereby said resilient lip acting as said restoring spring directly maintains said rod against said driver.

2. The extrusion die defined in claim 1 wherein said servomotor, said transmission and said driver form a unit received in a receptacle formed in said body in a region of said rod, said control and regulating device further comprising at least one adjusting screw threaded into a said body and acting upon said unit for positioning same.

* * * * *